United States Patent

Duncan

[15] 3,643,630
[45] Feb. 22, 1972

[54] INFLATION TUBE CONNECTION

[72] Inventor: Lloyd P. Duncan, Washington, Mo.

[73] Assignee: Zero Manufacturing Company, Washington, Mo.

[22] Filed: Jan. 8, 1970

[21] Appl. No.: 1,458

[52] U.S. Cl. .......................................... 119/14.47, 119/14.54
[51] Int. Cl. ........................................................ A01j 05/04
[58] Field of Search ............................... 119/14.47–14.55, 119/14.46, 14.36

[56] References Cited

UNITED STATES PATENTS

| | | | |
|---|---|---|---|
| 2,626,590 | 1/1953 | Smith | 119/14.54 |
| 2,425,901 | 8/1947 | Thomas | 119/14.46 |
| 1,859,213 | 5/1932 | McCornack | 119/14.46 UX |
| 2,929,354 | 3/1960 | Stevens | 119/14.54 |
| 3,079,891 | 3/1963 | Miller | 119/14.45 X |

Primary Examiner—Hugh R. Chamblee
Attorney—Mason, Mason & Albright

[57] ABSTRACT

A milking claw assembly has a flexible inflation housed within a shell and the inflation has a thickened hose with a large interior diameter at its lower end. The terminal end of the hose is bent relative to the hose's remainder so that when attached to a bias cut inlet nipple on a milk receiver, the hose sags at its bent portion to close off the inlet and preserve the vacuum when not milking. At the same time the relatively stiff hose firmly fixes the receiver and claw assembly to a cow during milking providing lift and preventing excessive sway of the receiver.

5 Claims, 3 Drawing Figures

PATENTED FEB 22 1972 3,643,630

INVENTOR
LLOYD P. DUNCAN

BY Mason, Mason & Albright
ATTORNEYS

INFLATION TUBE CONNECTION

DESCRIPTION OF THE PREFERRED EMBODIMENTS

In copending application entitled "Teat Cup Assembly," of Penrose Lucas Albright, filed on even date, FIG. 19 discloses an inflation hose having its terminal end bent at an angle from the upper section of the hose. When this hose is fitted on a nipple of the milk receiver, an easily handled assembly is provided which allows for the free flow of milk with essentially no pressure drop during milking. In other words, the inside diameters of the hoses are large enough to accept 3 gallons/minute, to cite an extreme example, with no backup of milk into the teat cup when fast milking cows are serviced.

BRIEF DESCRIPTION OF THE DRAWINGS

In FIG. 1, the teat cup unit includes shell 1 which is preferably of clear rigid plastic. Resilient, flexible inflation 3, having an upper relatively thin portion 5 is housed within shell 1 and a flexible web 7 with a teat receiving opening 9 therein. The web 7 has a foldable edge 10 which overlaps the upper rim of the shell in substantially airtight relationship.

Figure 1:
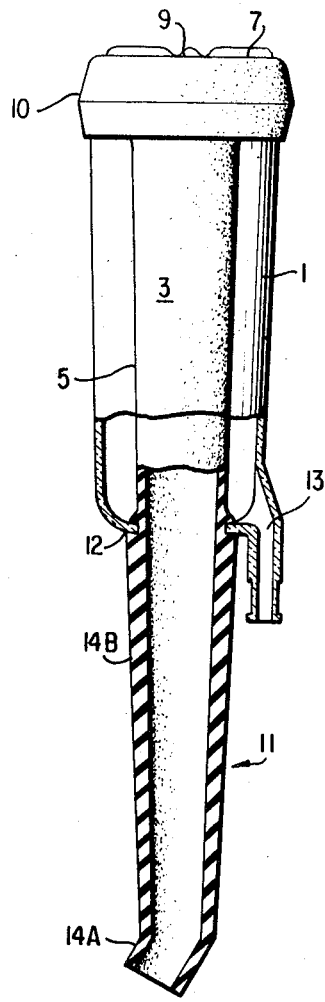
FIG. 1 is a side elevation of the inflation and shell with parts broken away.

At the lower end of portion 5, the inflation again fits through an opening in shell 1 with an airtight seal, the portion 5 being thickened into a hose portion 11 which is notched at 12 to receive the lower edges of shell 1. A pulsating hose nipple 13 is also provided at the lower end of the shell.

The terminal end 14A of hose 11, is bent relative to the remainder 14B of the hose. By way of example, the upper portion 5 can be, say about 0.075 inch and the hose 11 about three- or fourfold in thickness as portion 5. The interior diameter of hose 11 should be about 0.5 inch or larger. If significantly larger than 0.5 inch, then the wall thickness of hose 11 should be correspondingly increased. In any event, the hose 11 is self-supporting and exhibits significant sag only when extra weight such as shell 1 is included and the assembly is detached from a cow.

In the prior art claw assemblies, the interior diameter of the tube conduits leading from the shell to the receiver are in the order of about one-fourth to three-eighth inch. With such small dimensions, milk frequently backs up in the inflation with the unsanitary result that the cow's teats are literally washed in the cow's milk. At the same time, the small interior diameters of the prior art conduits do not require wall thicknesses more than about one-eighth inch, usually less, and a tube rather than a hose formed the milk conduit.

Also, when relatively heavy metal shells were used, the inflation tubes would bend over their respective inlet nipples on the receiver when disconnected from the cow's teats and close the entrance nipples. This would preserve the partial vacuum in the receiver, at least to some extent. Hence, there was and is no need to form the thin-walled, relatively small conduit tubes with bent ends to insure nipple entrance cutoff, particularly when the nipple is flared as seen in U.S. Pat. No. 2,425,901. By the same token, the highly supple prior art tubes do not properly secure the receiver to the cow and most importantly, the interior diameters of the tubes do not allow the conduits of milk to the receiver without overfilling and backing up. The result of using prior art structures is fluctuating pressure changes in the system during milking as well as an unsanitary condition. The former is a prime suspect in causing mastitis and the latter is obviously undesirable.

Figure 2:
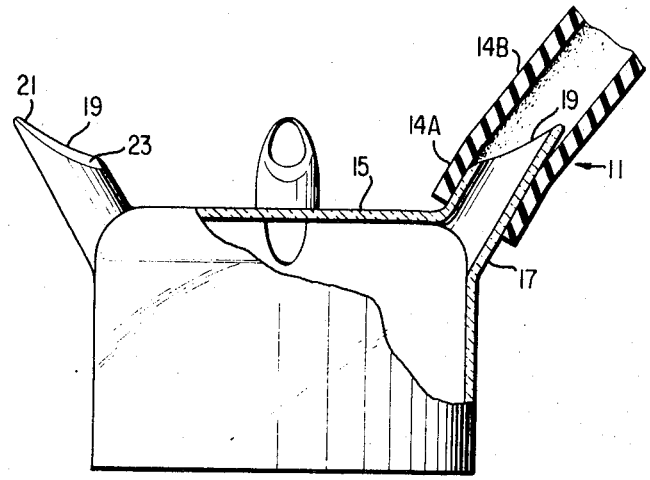
FIG. 2 is a side elevation of the inflation connected to a receiver cap with parts broken away showing the position of the inflation hose during milking.

In FIG. 2, a milk receiver cap 15 is shown with inlet nipples 17 for receiving teat cup hoses. When the terminal ends of four hoses identical to hose 11 are fitted on the nipples 17 as shown in the drawings and their inflations secured to a cow's teats, the bent hoses serve to connect the receiver up relatively tight to the cow because the offset bends in the hoses resist deformation and impart a slight spring effect. The inherent stiffness of the relatively thick hoses insures that the milk receiver will be firmly fixed in place. The hoses are of rubber or other resilient, flexible material normally used in the trade.

The effect of connecting hoses 11 on nipples 17 so that the weight of the receiver is downward and resisted by the four bent terminal ends 14A, is to create an even outward pull on each quarter of the cow's teats and, in some cows, the amounts of milk received from each of the teats are more uniform. Also, there is a lift effect which provides more space between a low uddered cow and the floor. Further, when a cow is fresh with its udder full and swollen, the teats are far apart so that teat cups with bent hoses like those described herein, are more easily fitted on the animal.

Figure 3:
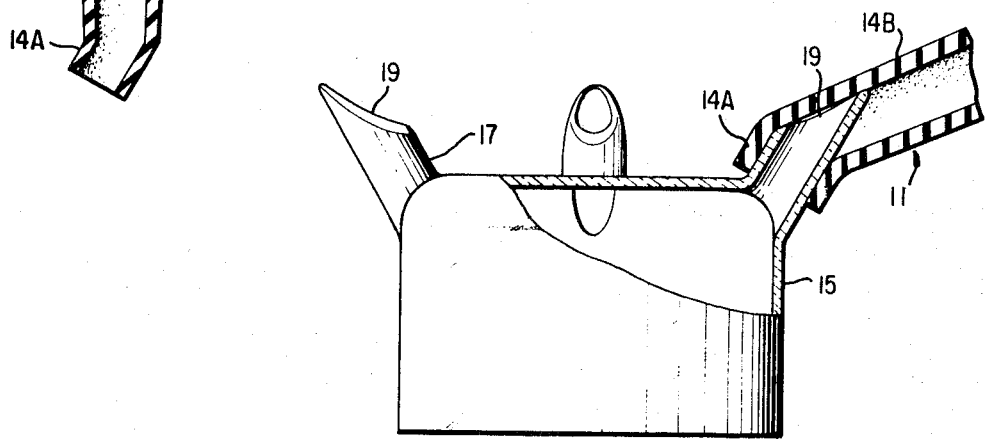
FIG. 3 is a side elevation of the inflation connected to a receiver cap with parts broken away showing the natural position of the inflation hose when disconnected from an animal.

However, when released from the teats, each of the hoses naturally fall to the position of hose 11 seen in FIG. 3 with the remainder 14B of the hose closing off the nipple and preserving the partial vacuum established within the receiver.

Each nipple 17 extends at an angle from the vertical into the receiver 15, preferably at an angle of about 20°–30° and the hose 11 can be molded to have a like angle between its terminal end and the remainder. Thus, in slack or rest position, the remainder of the hose 11 and the teat cups extend outwardly at 45° or more from the vertical. In this latter position, the opening 19 in nipple 17 is substantially completely shut off. The nipple 17 is bias cut at its outer end 21 to present a curved upper edge 23 with the outer parts of the edge 23 being rounded off. When viewed from the side, the end 21 presents a saddled appearance.

What is claimed is:

1. A milking claw assembly comprising a milk receiver and an inflation housed in a shell, said inflation including an integral flexible hose extending downwardly from the shell to an angled inlet nipple leading into said milk receiver, said hose having a terminal end being formed with an angular bend in its normal position of rest relative to the remainder of said hose, said terminal end telescopically receiving said nipple whereby said shell and inflation are allowed to extend away from said receiver towards a substantially vertical position in operation and said inlet nipple is closed by a portion of the remainder of said hose when said inflation is disconnected from a milking animal and extends towards a substantially horizontal position.

2. The assembly of claim 1, wherein said inlet nipple is angled at about 20°–30° from the vertical and the terminal end of said hose is bent a like amount relative to the remainder thereof.

3. The assembly of claim 1, wherein the inside diameter of said hose is about one-half inch or more.

4. The assembly of claim 1, wherein the outer end of said nipple is bias cut whereby the rim of said end is located approximately midway between a vertical and a horizontal plane.

5. The assembly of claim 4, wherein the outer edges of said rim are rounded.